United States Patent
Saito et al.

[11] Patent Number: 6,052,355
[45] Date of Patent: Apr. 18, 2000

[54] OPTICAL PICKUP APPARATUS AND A COMPENSATION ELEMENT THEREFOR

[75] Inventors: Shinichiro Saito; Norikazu Arai, both of Hachioji, Japan

[73] Assignee: Konica Corporation, Tokyo, Japan

[21] Appl. No.: 09/047,227

[22] Filed: Mar. 25, 1998

[30] Foreign Application Priority Data

Mar. 27, 1997 [JP] Japan .................................. 9-074856

[51] Int. Cl.[7] ....................................................... G11B 7/00
[52] U.S. Cl. ................................. 369/112; 369/94; 369/58
[58] Field of Search ................................. 369/58, 54, 53, 369/47, 48, 112, 110, 109, 108, 93, 94, 44.12, 44.37

[56] References Cited

U.S. PATENT DOCUMENTS

| | | | |
|---|---|---|---|
| 5,748,602 | 5/1998 | Chao et al. | 369/112 |
| 5,894,464 | 4/1999 | Kim et al. | 369/94 X |
| 5,966,364 | 10/1999 | Kamatani | 369/94 X |

FOREIGN PATENT DOCUMENTS

| | | |
|---|---|---|
| 07/57271 | 3/1995 | Japan . |
| 09/42222 | 2/1997 | Japan . |

*Primary Examiner*—Muhammad Edun
*Attorney, Agent, or Firm*—Finnegan, Henderson, Farabow, Garrett & Dunner, L.L.P.

[57] ABSTRACT

An optical pickup for performing a reproduction or recording operation of information on one of different kinds of optical information recording medium, each having a transparent base board in different thickness. The optical pickup includes: a laser beam generator; a light converging optical system for converging luminous flux from the laser beam generator through the transparent base board of the optical information recording medium onto an information recording surface of the optical information recording medium; a changing member for changing an optical path of the luminous flux, being reflected on the information recording surface, to be different from an optical path of the luminous flux, being emitted from the laser beam generator; an photo-detector for detecting the luminous flux being reflected on the information recording surface; and a compensation element, provided between the changing member and the photo-detector, for correcting spherical aberration of the luminous flux.

25 Claims, 8 Drawing Sheets

OPTICAL PICKUP APPARATUS AND A COMPENSATION ELEMENT THEREFOR

BACKGROUND OF THE INVENTION

The present invention relates to an optical pickup apparatus wherein a light flux emitted from a light source is converged by a light-converging optical system on an information recording surface through a transparent base board of an optical image recording medium, and whereby information is recorded on the information recording surface or information on the information recording surface is reproduced (recording/reproduction), and more particularly, to an optical pickup apparatus wherein a first optical information recording medium whose transparent base board has a thickness of t1 and a second optical information recording medium whose transparent base board has a thickness of t2 (provided that t2≠t1) are used as an optical information recording medium. The invention further relates to a compensation element for the optical pickup apparatus stated above.

With a shortwave red semiconductor laser which has lately been put to practical use, there has been advanced development of a DVD (digital video disk) which is a high density optical information recording medium having a larger capacity in its size similar to that of a CD (compact disk) that is a conventional optical information recording medium (another name: optical disk). In the DVD, numerical aperture NA of an objective lens on the part of an optical disk is 0.6 when a shortwave semiconductor laser of 635 nm or 650 nm is used. Incidentally, compared with a CD, the DVD is of higher density with a track pitch of 0.74 μm and a shortest pit length of 0.4 μm which respectively are less than 1.6 μm and 0.83 μμ both representing a track pitch and a shortest pit length for the CD. In addition to the CD and DVD mentioned above, optical disks of various standards, such as, for example, DVD-RAM (rewritable digital video disk), CD-R (write-once compact disk), LD (laser disk), MD (mini-disk) and MO (magnet-optic disk) are planned to be commercialized or are already widespread.

In the present age, various optical disks which are different each other in many points such as a size, a base board thickness, recording density and a wavelength to be used are on the market, and optical pickup apparatuses functionable with the various optical disks have been proposed. As one of them, there has been proposed an optical pickup apparatus wherein light-converging optical systems complying with different optical disks are provided and the light-converging optical systems are switched to be used depending on an optical disk to be reproduced. In this optical pickup apparatus, however, plural light-converging optical systems are required to cause high cost, a driving mechanism for switching the light-converging optical systems is required to cause an apparatus to be complicated, and accuracy for the switching is also required, which makes this optical pickup apparatus to be unpreferable.

Under the background stated above, there have been proposed various optical pickup apparatuses capable of recording information on and reading information from plural optical disks (hereinafter referred to as recording/reading) by using one light-converging optical system. As one of them, TOKKAIHEI 7-57271 discloses an optical pickup apparatus wherein an objective lens which is designed so that a wave front aberration owned by a beam to be converged is 0.07 λ or less is used for the first optical disk with a transparent base board having a thickness of t1, while a converged spot is formed under the slight defocusing state for the second optical disk with a transparent base board having a thickness of t2.

However, in the optical pickup apparatus described in the above-mentioned publications, one objective lens is used for reproduction of two optical disks. Therefore, when reading one of the two optical disks, flare is caused, and when detecting a luminous flux reflected on an optical disk, a linear range of focus error signals is narrow, and stability of focusing control is lowered.

SUMMARY OF THE INVENTION

With the background stated above, an object of the invention is to enable one light-converging optical system to record on and reproduce from plural optical information recording media, and to realize with a simple structure at low cost as well as to improve focus error signals.

The object stated above can be attained by the following structures.

(1) An optical pickup apparatus to converge a luminous flux emitted from a light source on an information recording surface through a transparent base board of an optical information recording medium by the use of a light-converging optical system so as to record information onto an information recording surface or to reproduce the information from the information recording surface (recording/reproduction), wherein a first optical information recording medium whose transparent base board has a thickness of t1 and a second optical information recording medium whose transparent base board has a thickness of t2 (provided that t2≠t1) are used as the optical information recording medium, and there are provided a changing means which changes an optical path for a luminous flux reflected on the information recording surface to an optical path which is different from an optical path for a luminous flux emitted from a light source, an photodetecting means which detects a luminous flux reflected on the information recording surface through the changing means, and a compensation means which is provided between the changing means and photo-detecting means and corrects spherical aberration caused on a luminous flux which is reflected on the information recording surface of at least one optical information recording medium and passes through the changing means when conducting recording/reproduction of the optical information recording medium mentioned above.

(2) The optical pickup apparatus described in the structure (1) above, wherein, when m1 represents an image forming magnification of the light-converging optical system in the recording and reading of the first optical information recording medium, and m2 represents an image forming magnification of the light-converging optical system in the recording and reading of the second optical information recording medium, the compensation means corrects spherical aberration caused by a difference of thickness between t1 and t2 or spherical aberration caused by a difference between t1 and t1 and a difference of image forming magnification of the light-converging optical system between m1 and m2.

(3) The optical pickup apparatus described in the structure (1) or (2) above, wherein the light source mentioned above has therein a first light source for recording on and reading from the first optical information recording medium and a second light source for recording on and reading from the second optical information recording medium.

(4) The optical pickup apparatus described in either one of the structures (1)–(3) above, wherein the photo-detecting means stated above has therein a first photo-detecting means which detects a luminous flux reflected on the information recording surface of the first optical information recording medium and a second photo-detecting means which detects a luminous flux reflected on the information recording surface of the second optical information recording medium.

(5) The optical pickup apparatus described in the structure (4) above, wherein the compensation means is provided between the changing means and the second photo-detecting means.

(6) The optical pickup apparatus described in the structure (5) above, wherein the compensation means corrects spherical aberration caused on a luminous flux which is reflected on the information recording surface of the second optical information recording medium and passes the changing means.

(7) The optical pickup apparatus described in either one of the structures (1)–(6) above, wherein, when NA1 represents a required numerical aperture of the light-converging optical system necessary (at the side of the optical information recording medium) for recording on and reading from the first optical information recording medium, and NA2 represents a necessary numerical aperture on the part of the optical information recording medium of the light-converging optical system necessary for recording on and reading from the second optical information recording medium (provided that NA1>NA2), the compensation means is an element which makes the first luminous flux near an optical axis to be used for detection of light fluxes reflected on information recording surfaces of the first optical information recording medium and the second optical information recording medium, then makes the second luminous flux which is located to be outside the first luminous flux to be used for detection of the luminous flux reflected mainly on the image recording surface of the second optical information recording medium, and makes the third luminous flux which is located to be outside the second luminous flux to be used for detection of the luminous flux reflected mainly on the image recording surface of the first optical information recording medium.

(8) The optical pickup apparatus described in either one of the structures (1)–(7) above, wherein the compensation means has plural divided surfaces which are formed to be concentric with an optical axis on at least one side, a luminous flux which passes through the first divided surface near the optical axis and through the third divided surface that is outside the first divided surface forms images on the photo-detecting means when a luminous flux reflected on the information recording surface of the first optical information recording medium is detected by the photo-detecting means, and a luminous flux which passes through the second divided surface located between the first divided surface and the third divided surface does not form images on the photodetecting means.

(9) The optical pickup apparatus described in either one of the structures (1)–(8) above, wherein the compensation means has plural divided surfaces which are formed to be concentric with an optical axis on at least one side, and a beam of light passing through the second divided surface being outside the first divided surface forms images on the portion between the position where a light beam passing through the vicinity of the optical axis forms images and the position where a light beam passing through the end portion of the first divided surface in the direction perpendicular to the optical axis forms images, when a luminous flux reflected on the information recording surface of the second optical information recording medium is detected by the photodetecting means.

(10) The optical pickup apparatus described in either one of the structures (1)–(9) above wherein, when NA2 represents a necessary numerical aperture on the part of the optical information recording medium of the light-converging optical system necessary for recording on and reading from the second optical information recording medium, the compensation means causes spherical aberration on the photo-detecting means to be changed discontinuously at least on two aperture positions in the vicinity of the numerical aperture corresponding to the necessary numerical aperture NA2.

(11) The optical pickup apparatus described in the structure (10) above wherein, when NAL represents the smallest numerical aperture and NAH represents the largest numerical aperture among at least two aperture positions, the compensation means changes discontinuously in the opposite direction each other at the numerical aperture NAL and the numerical aperture NAH.

(12) The optical pickup apparatus described in the structure (11) above, wherein, when the photo-detecting means detects a luminous flux reflected on the information recording surface of the second optical information recording medium, the compensation means causes the spherical aberration on the photo-detecting means from numerical aperture NAL to numerical aperture NAH on the photo-detecting means to be the spherical aberration having the same sign as that of the spherical aberration of other numerical aperture.

(13) The optical pickup apparatus described in either one of the structures (1)–(12) above, wherein, when the light-converging optical system converges a luminous flux emitted from a light source on the information recording surface of the first optical information recording medium, best wave front aberration is 0.05 $\lambda$ rms or less (provided that $\lambda$ is a wavelength of a light source which is used when reading from and recording on the first optical information recording medium).

(14) A correction element of an optical pickup apparatus in which a luminous flux emitted from a light source is converged by a light-converging optical system on the information recording surface through a transparent base board of an optical information recording medium, and a luminous flux reflected on the information recording surface is changed by a changing means to an optical path which is different from the luminous flux emitted from the light source to be detected by an photo-detecting means, the correction element being between the changing means and the photo-detecting means of the optical pickup apparatus and being provided with a stepped surface at least on one side thereof.

(15) The correction element of an optical pickup apparatus described in the structure (14) above, wherein a surface opposite to the surface where the stepped surface is provided is cylindrical or toric.

Figure 2A:
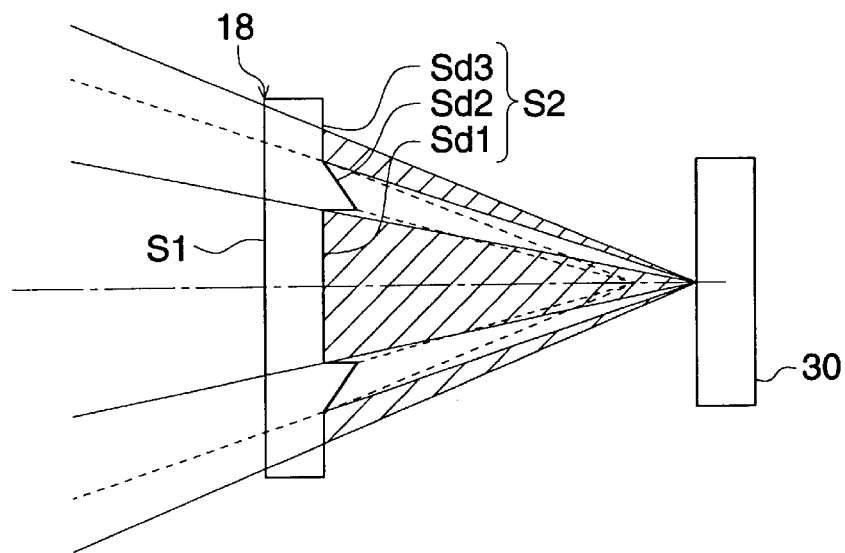
Figure 2B:
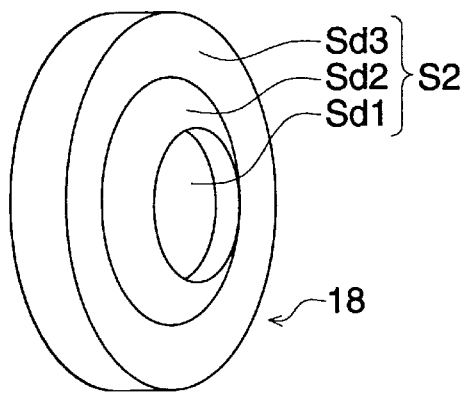
Figure 2C:
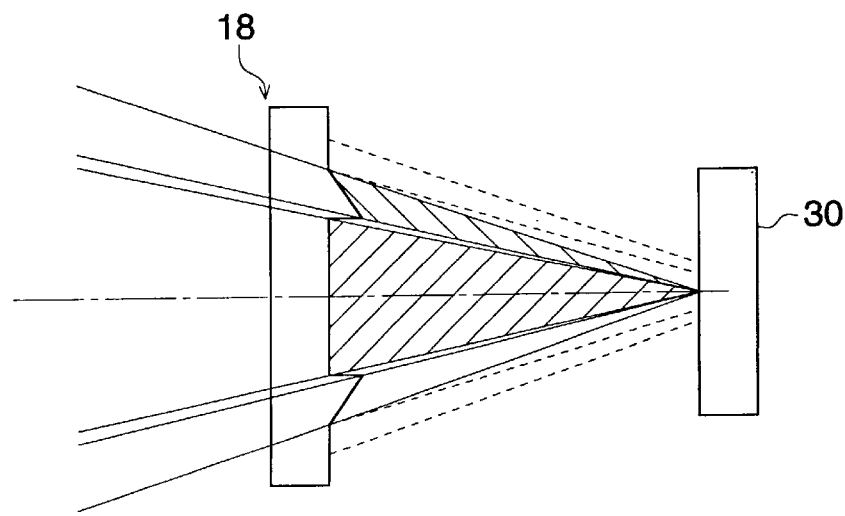
Figure 3A:
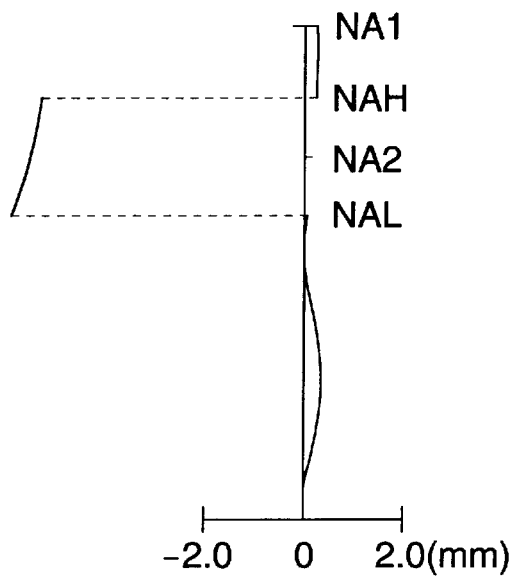
Figure 3B:
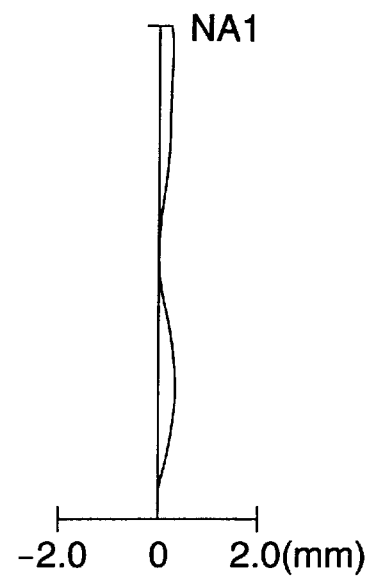
Figure 3C:
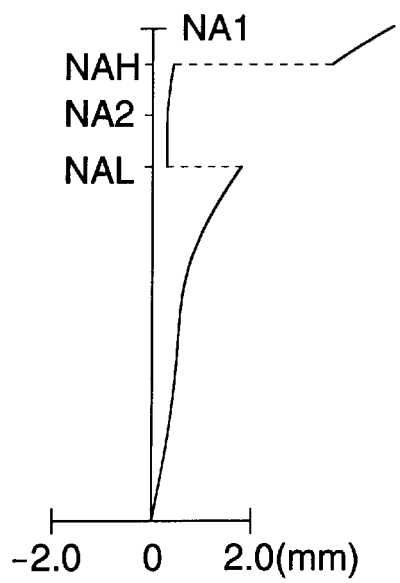
Figure 3D:
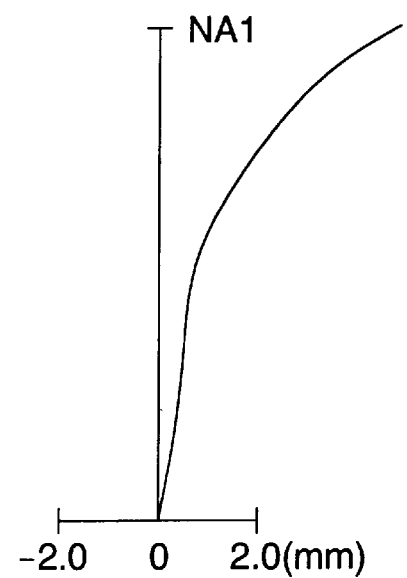

Each of FIGS. 2 (a)–2 (c) is a diagram showing the structure of a compensation means illustratively.

Each of FIGS. 3 (a)–3 (d) is a diagram of spherical aberration on an photo-detecting means for illustrating the function of the compensation means.

Figure 4:
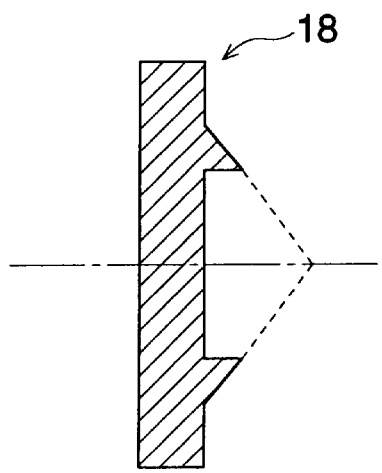
Figure 4:
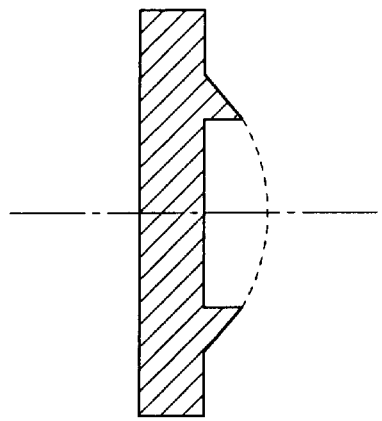
Figure 4:
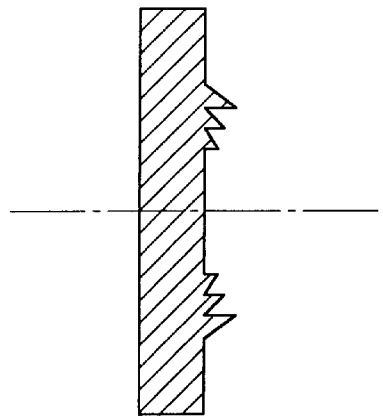

Each of FIGS. 4 (a)–4 (c) is a diagram showing the variation of the compensation means.

Figure 5:
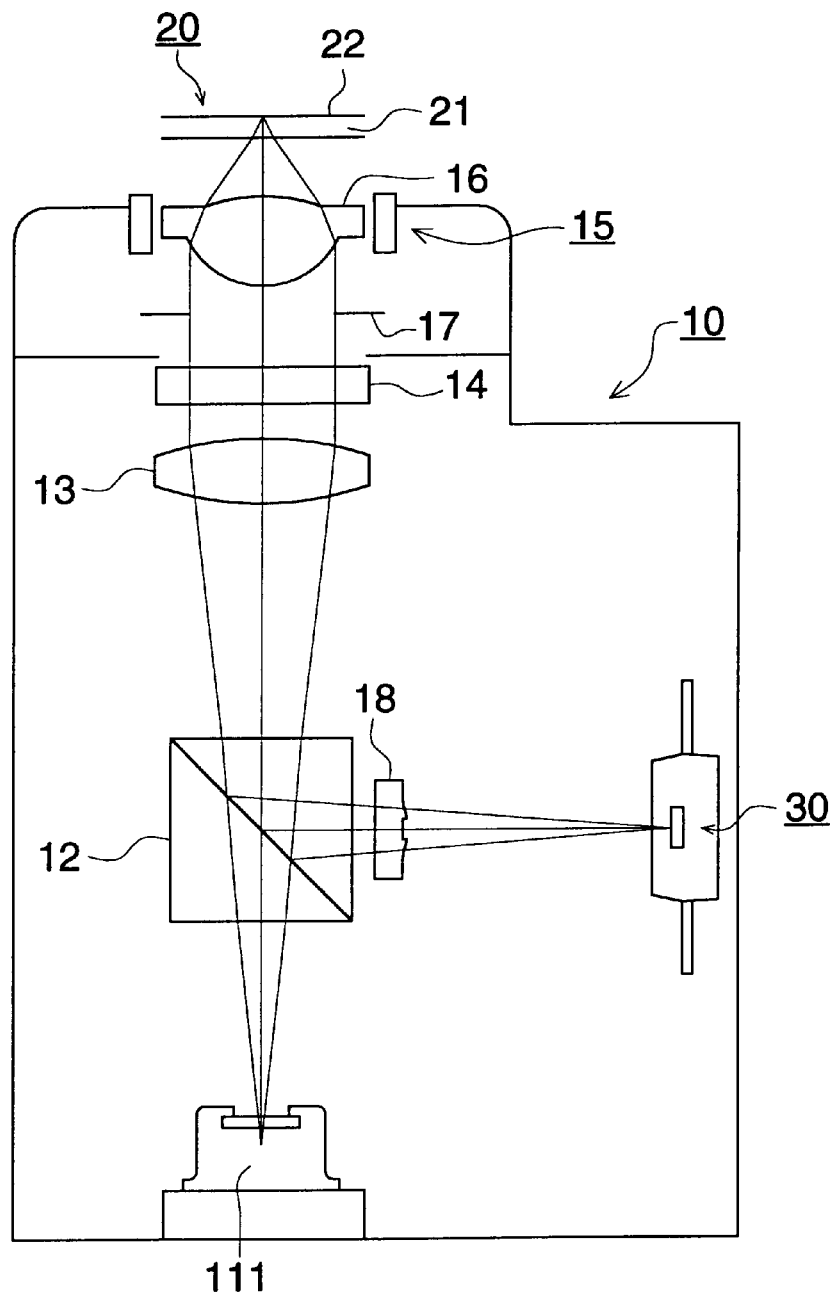

FIG. 5 is a schematic structural diagram of an optical pickup apparatus in which the first embodiment is deformed.

Figure 6:
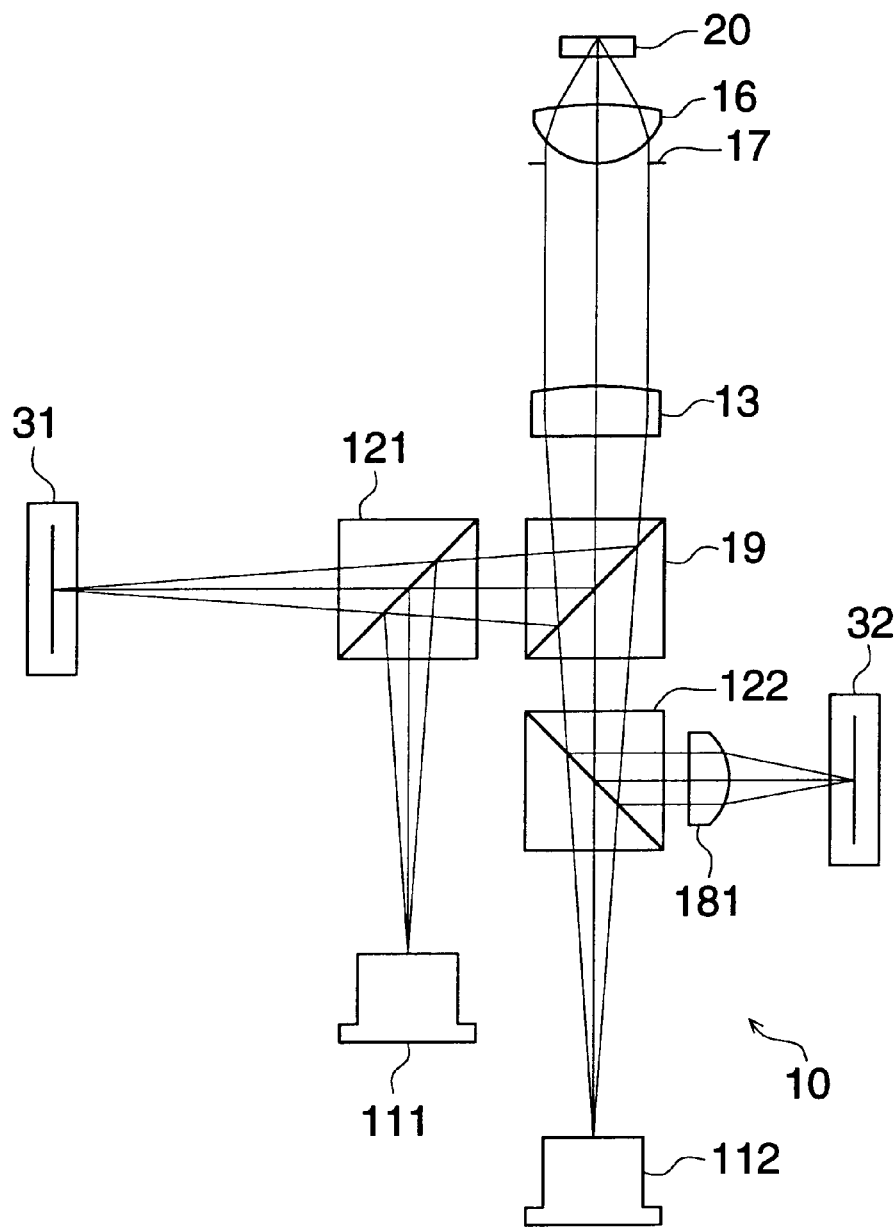

FIG. 6 is a schematic structural diagram of optical pickup apparatus 10.

Figure 7:
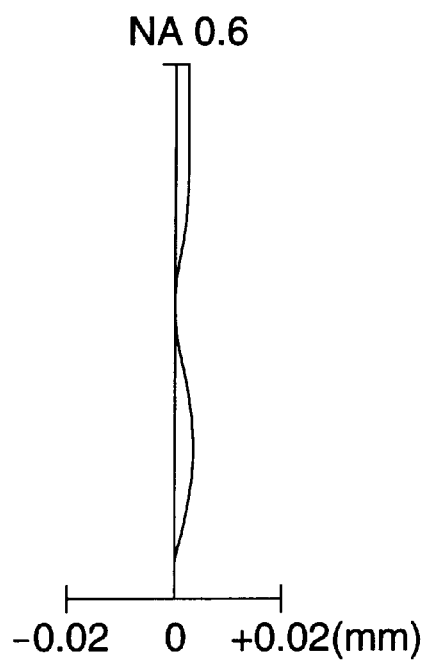
Figure 7:
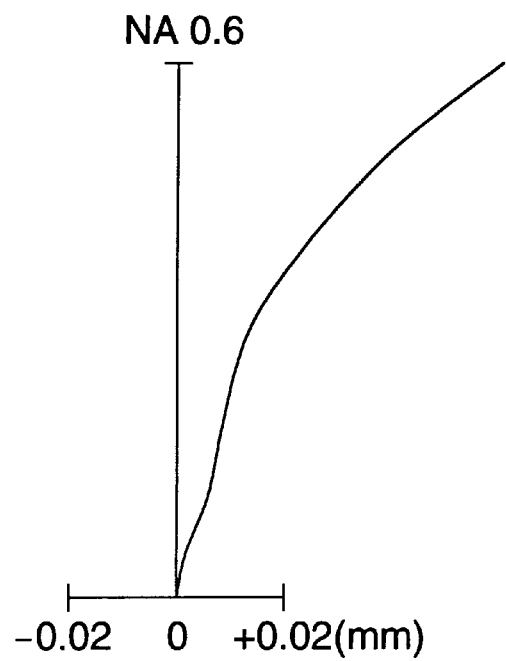

Each of FIGS. 7 (a) and 7 (b) is a diagram of spherical aberration on the information recording surface.

Figure 8:
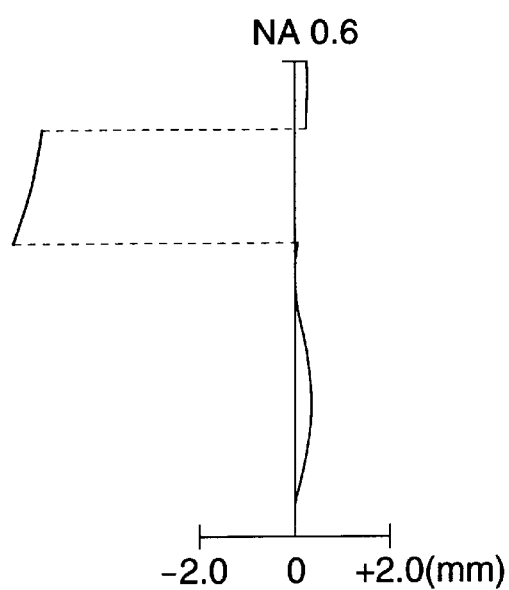
Figure 8:
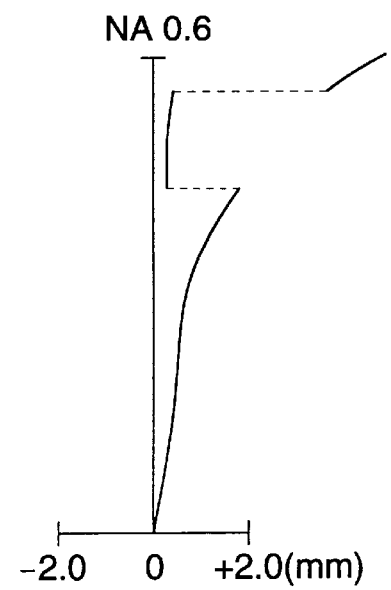

Each of FIGS. 8 (a) and 8 (b) is a diagram of spherical aberration on the photo-detecting means.

DETAILED DESCRIPTION OF THE INVENTION

The invention will be explained as follows with reference to the drawings. Incidentally, the same structural element is given the same numeral.

(First Embodiment)

Figure 1:
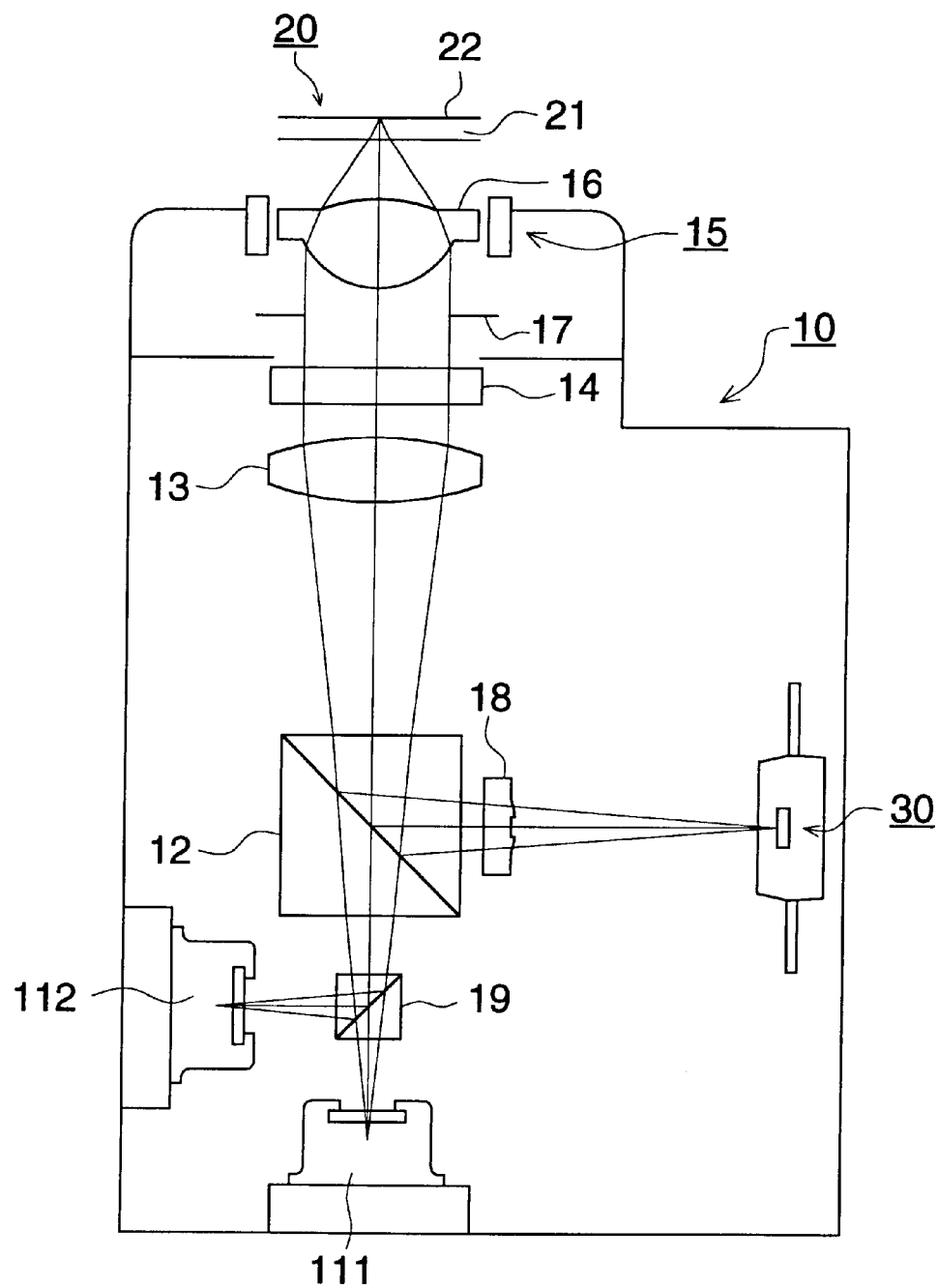
FIG. 1 is a schematic structural diagram of an optical pickup apparatus of the first embodiment.

The first embodiment will be explained. FIG. 1 is a schematic structural diagram of optical pickup apparatus 10.

The optical pickup apparatus 10 in the present embodiment conducts recording/reproduction (recording information on information recording surface 22 of optical disk 20 or reading information stored on the information recording surface 22 is also called recording/reproduction) for plural optical disks 20 respectively having different thickness of transparent base board 21 which serve as optical disk 20 representing an optical information recording medium. Hereafter, the plural optical disks 20 will be represented in explanation thereof by the first optical disk whose transparent base board has a thickness of t1 and the second optical disk whose transparent base board has a thickness of t2 which is different from the thickness t1 of the transparent base board of the first optical disk. Let is be assumed that NA1 represents a necessary numerical aperture on the part of the optical disk of a light-converging optical system (described later) necessary for recording/reproduction for the first optical disk and NA2 represents a necessary numerical aperture on the part of the optical disk of a light-converging optical system necessary for recording/reproduction for the second optical disk (NA1 is greater than NA2 because the first optical disk representing the information recording medium is higher in terms of density than the second optical disk representing the information recording medium in the following explanation). Incidentally, in the following explanation, DVD (including DVD-RAM) means the first optical disk in which t1 representing the thickness of a transparent base board is 0.6 mm, and CD (including CD-R) means the second optical disk in which t2 representing the thickness of a transparent base board is 1.2 mm (namely, t1<t2).

The optical pickup apparatus 10 in the present embodiment is provided with a light source that is composed of the first light source represented by fist semiconductor laser 111 (wavelength λ=610 nm–670 nm) and the second light source represented by second semiconductor laser 112 (wavelength λ=740 nm–870 nm). The first semiconductor laser 111 is a light source which is used when conducting recording/reproduction of the first optical disk, while the second semiconductor laser 112 is a light source which is used when conducting recording/reproduction of the second optical disk. In the present embodiment, two light sources are used in order to make recording/reproduction of CD-R representing the second optical disk to be possible. However, it is also possible to use only one light source as will be stated later.

Compounding means 19 is a means capable of compounding a luminous flux emitted from the first semiconductor laser 111 and a luminous flux emitted from the second semiconductor laser 112. It is composed of dichroic prism 19 in the present embodiment. The compounding means 19 is a means which makes a luminous flux emitted from the first semiconductor laser 111 and a luminous flux emitted from the second semiconductor laser 112 to be in the same (or could be in mostly the same) optical path so that both luminous fluxes may be converged respectively on the first optical disk and the second optical disk through one light-converging optical system which will be stated later.

The light-converging optical system is a means which converges a luminous flux emitted from a light source (the first semiconductor laser 111 or the second semiconductor laser 112) on information recording surface 22 through transparent base board 21 of optical disk 20 and thereby forms a spot. In the present embodiment, the light-converging optical system is provided with collimator lens 13 which converts a luminous flux emitted from a light source into a collimated light (or could be a mostly collimated light) and objective lens 16 converges a luminous flux which is converted by collimator lens 13 into a collimated light. This light-converging optical system is arranged so that best wave front aberration may be 0.05 λ rms or less when a luminous flux emitted from the first semiconductor laser 111 is converged on the information recording surface of the first optical disk. "Best wave front aberration" in this case means a wave front aberration wherein defocus component and tilt component are corrected, and its value is expressed with root mean square (rms).

In the present embodiment, only one light-converging optical system is used for recording/reproduction of plural optical disks as stated above. It is therefore possible to realize optical pickup apparatus 10 at low cost and with a simple structure.

Incidentally, in the present embodiment, the light-converging optical system is of the so-called infinite type wherein collimator lens 13 and objective lens 16 are used. However, the light-converging optical system may also be of the so-called finite type wherein collimator lens 13 is not used and only objective lens 16 which converges directly divergent light from a light source is used or of the so-called semi-finite type wherein a lens which reduces a divergence degree of divergent light from a light source or a (coupling) lens which changes a luminous flux from a light source to a converged light and an objective lens which converges a luminous flux passing through the aforesaid lenses are used.

In the light-converging optical system, there are provided quarter wavelength plate 14 and iris 17. The quarter wavelength plate 14 changes light passing through collimator lens 13 from linear polarization to circular polarization, and iris 17 restricts a luminous flux to a numerical aperture corresponding to numerical aperture NA1. In the present embodiment, the iris 17 fixes a numerical aperture to restrict to the numerical aperture corresponding to numerical aperture NA1, and requires no excessive mechanism, realizing low cost. For recording/reproduction of the second optical disk, however, the numerical aperture of the iris 17 may also be of a variable type so that a numerical aperture may be restricted to that corresponding to numerical aperture NA2.

Changing means 12 is a means which changes an optical path of a luminous flux reflected on the information recording surface to an optical path that is different from an optical path of a luminous flux emitted from a light source (the first semiconductor laser 111 or the second semiconductor laser 112). Namely, the changing means 12 is a means which makes an optical path of a luminous flux emitted from a light source (the first semiconductor laser 111 or the second semiconductor laser 112) and an optical path of a luminous flux reflected on the information recording surface of an optical disk to be the same between the changing means 12 and the optical disk. In the present embodiment, it is composed of polarized beam splitter 12, and it does not change an optical path of a luminous flux emitted from a light source, but it changes an optical path of a luminous flux reflected on the information recording surface of an optical disk so that it is led to photo-detecting means 30 which will be explained later. However, it is also possible to cause an optical path of a luminous flux reflected on the information recording surface to be passed by changing an optical path emitted from a light source. Further, as a changing means, a beam splitter is used. For concrete example, a polarized beam splitter, a polarized hologram beam splitter, a cube beam splitter, a plate beam splitter, a dichroic filter and the like are used.

Photo-detecting means 30 is a means which detects a luminous flux reflected on the information recording surface through polarized beam splitter 12 (changed by polarized beam splitter 12 in terms of optical path). As a photo-detecting means, a pin photo diode can be used. In the present embodiment, low cost is realized by detecting luminous fluxes reflected respectively on the first optical disk and the second optical disk with one photo-detecting means 30. By detecting, with the photo-detecting means 30, the light amount distribution change of a luminous flux reflected on the information recording surface, focus error signals, track detection and reproduction signals (information) are read by an unillustrated operation circuit. Incidentally, various known methods such as a focus error signal, a track detection, an astigmatism method, a knife edge method, an SSD method, a push-pull method and a 3-beam method can be used for detection.

Two-dimensional actuator 15 is a means to move objective lens 16, and the mean includes two types; one is for focusing control to move the objective lens based on focusing error signals obtained by the operation circuit, and the other is for tracking control to move based on track error signals. The two-dimensional actuator in the present embodiment (for focusing control) moves objective lens 16 (to the best focus) in the case of recording/reproduction of the first optical disk (DVD) so that a beam spot on the information recording surface of DVD (a spot formed when a luminous flux emitted from the first semiconductor laser 111 is converged by the light-converging optical system) may be the smallest (becoming a circle of least confusion), and the two-dimensional actuator moves, in the case of recording/reproduction of the second optical disk (CD), the objective lens 16 to the front side position which is closer to the objective lens 16 than the position where the beam spot (a spot formed when a luminous flux emitted from the second semiconductor laser 112 is converged by the light-converging optical system) on the information recording surface of CD becomes a circle of least confusion.

A background for the foregoing is as follows. In the case of recording/reproduction for the second optical disk, when the thickness t2 of the transparent base board of the second optical disk is greater than the thickness t1 of the transparent base board of the first optical disk, spherical aberration is caused, and a spot size is large at the position where a beam spot located behind the position of a paraxial image point becomes a circle of least confusion, which makes it impossible to read a pit (information) on the second optical disk. However, on the front side position which is closer to objective lens 16 than the position where the circle of least confusion is formed, there is formed a spot which is composed of a nucleus in which an amount of light is concentrated at the center portion thereof and of flare representing unwanted light surrounding the nucleus and is totally larger than the circle of least confusion. Accordingly, in the case of recording/reproduction of the second optical disk, the objective lens 16 is moved to the front side position and the nucleus is detected by photodetecting means 30, thereby, focus error signals, track error signals and reproduction signals (information) are read.

In the optical pickup apparatus 10 mentioned above, when conducting recording/reproduction for the second optical disk, there is caused flare on the spot formed on the information surface of the second optical disk (flare is caused independently of whether the objective lens 16 is moved to the front side position or not, and is caused by the difference between thickness t1 of the transparent base board of the first optical disk and thickness t2 of the transparent base board of the second optical disk). Therefore, when the flare is detected as it is by photo-detecting means 30, linearity of focus error signals is narrowed by an influence of the flare, and stability of focusing control is lowered.

Therefore, in the present embodiment, there is provided compensation means 18 representing an optical correction element between polarized beam splitter 12 and detecting means 30. This compensation means 18 is a means to correct spherical aberration caused on a luminous flux which is reflected on the information recording surface of an optical information recording medium on at least one side and passes through the changing means in the case of recording/reproduction of an optical information recording medium on at least one side. Incidentally, "a luminous flux which passes through polarized beam splitter 12 (changing means)" means a luminous flux which enters the photo-detecting means 30 without passing through the compensation means 18. In the present embodiment, the compensation means 18 can correct spherical aberration caused by the difference between thickness t1 of the transparent base board of the first optical disk and thickness t2 of the transparent base board of the second optical disk, because image forming magnification m1 of the light-converging optical system in recording/reproduction of the first optical disk and image forming magnification m2 of the light-converging optical system in recording/reproduction of the second optical disk are the same each other. Incidentally, when the image forming magnification m1 and that m2 are different from each other, the compensation means 18 is arranged so that it corrects spherical aberration caused by a difference between t1 and t2 and by a difference between image forming magnification of the light-converging optical system m1 and that m2. With regard to the correction, perfect correction is not necessarily required.

Since the compensation means 18 is provided between polarized beam splitter 12 and a detecting means in the present embodiment as stated above, it is possible to improve focus error signals caused by flare which is a problem when conducting, with one light-converging optical system, recording/reproduction of plural optical disks each being different in terms of a thickness of a transparent base board. In particular, in the present embodiment, it is not necessary to cause objective lens 16 to have specific functions as those described in examples of TOKUGANHEI 9-42222 (filed by the applicant of the invention), which eliminates a loss of light amount caused by objective lens 16, and enhances the intensity of light-converging on an optical disk. This is extremely effective when recording on an optical disk. Further, in the invention, spherical aberration is corrected in the vicinity of an photo-detecting means, which makes it possible to manufacture an optical pickup apparatus without requiring higher accuracy, compared with an occasion wherein spherical aberration is corrected by an objective lens.

Concrete structures of the compensation means 18 will be explained with reference to FIG. 2. FIG. 2 (*a*) is a diagram showing illustratively how a luminous flux passing through the compensation means 18 in recording/reproduction of the first optical disk forms images on photo-detecting means 30, while FIG. 2 (b) is a perspective view in which the compensation means 18 is viewed from the photo-detecting means 30, and FIG. 2 (c) is a diagram showing illustratively how a luminous flux passing through the compensation means 18 in recording/reproduction of the second optical disk forms images on photo-detecting means 30.

In the present embodiment, the compensation means 18 is a correction element in which a ring-shaped prism is provided on a parallel plate. More particularly, the compensation means is one wherein surface S1 on the part of an optical disk (upstream side in the direction of light advancement) is assumed to be a flat surface, and a ring-shaped prism is provided on surface S2 on the part of photo-detecting means 30 (downstream side in the direction of light advancement). Namely, the compensation means 18 is an element having on a part (a ring that is coaxial with an optical axis) thereof a function of light-converging. Therefore, surface S2 of the compensation means 18 is composed of plural (three in the present embodiment) divided ring surfaces coaxial with an optical axis including the first divided ring surface Sd1–third divided ring surface Sd3. A step is formed on a boundary between the divided ring surface Sd1 and the divided ring surface Sd2. In the compensation means 18, the second divided ring surface Sd2 thereof has a function to correct spherical aberration caused on a luminous flux which is reflected on the information recording surface of the second optical disk and passes through polarized beam splitter 12.

In further particulars, in the compensation means 18 in the present embodiment, the first luminous flux and the third luminous flux (luminous fluxes shown with hatched lines) passing respectively through the first divided ring surface Sd1 and the third divided ring surface Sd3 form images at the mostly same image forming position (on the detection (photoreception) surface of photo-detecting means 30) when conducting recording/reproduction of the first optical disk (see FIG. 2 (a)). In this case, the second luminous flux (a luminous flux shown with dotted lines) passing through the second divided ring surface Sd2 forms images at the position which is different from the image forming position for the first and third luminous fluxes (namely, the second luminous flux does not form images on the detection (photoreception) surface of photo-detecting means 30). Therefore, in recording/reproduction for the first optical disk, the first luminous flux and the third luminous flux are detected by the photo-detecting means 30, and focus error signals, track error signals, and reproduction signals (information) are read.

When conducting recording/reproduction for the second optical disk (see FIG. 2 (c)), the first luminous flux (shown with lines hatched upward obliquely from left to right) and the second luminous flux (shown with lines hatched downward obliquely from left to right) form images at the mostly same image forming position (on the detection (photoreception) surface of photo-detecting means 30). In this case, flare is caused on the third luminous flux (half thereof is shown with dotted lines), and the photo-detecting means 30 can detect the first and second luminous fluxes both reflected from the second optical disk.

In other words, the compensation means 18 in the present embodiment causes the first luminous flux passing through the vicinity of an optical axis where the numerical aperture is small to be utilized for detection of a luminous flux reflected from all optical disks capable of being subjected to recording/reproduction, then, divides a luminous flux passing through the outer side of the first divided ring surface for corresponding to each disk for reproduction, and utilizes each divided luminous flux for detection of a luminous flux reflected from each optical disk (the first and second optical disks in the present embodiment). In this case, it is assumed that the luminous flux to be utilized for detection of a luminous flux reflected from an optical disk having a greater necessary numerical aperture (first optical disk in the present embodiment) is a luminous flux (third luminous flux in the present embodiment) which is farther from the first luminous flux among divided luminous fluxes.

The compensation means 18 will further be explained with reference to FIG. 3 which is a diagram of spherical aberration on photo-detecting means 30 for illustrating functions of the compensation means 18. FIG. 3 (a) is a diagram of spherical aberration on photo-detecting means 30 through the compensation means 18 in recording/reproduction of a DVD, FIG. 3 (c) is a diagram of spherical aberration on photo-detecting means 30 through the compensation means 18 in recording/reproduction of a CD, FIG. 3 (b) is a diagram of spherical aberration on photo-detecting means 30 through no compensation means 18 in recording/reproduction of a DVD, and FIG. 3 (d) is a diagram of spherical aberration on photodetecting means 30 through no compensation means 18 in recording/reproduction of a CD. Incidentally, the axis of ordinate represents a numerical aperture corresponding to the numerical aperture of the light-converging optical system on the part of the optical disk, and the value thereon is represented by a numerical aperture of the light-converging optical system on the part of the optical disk.

Spherical aberration through no compensation means 18 (namely, spherical aberration caused on a luminous flux through polarized beam splitter 12) is hardly caused in recording/reproduction of a DVD (see FIG. 3 (b), but is caused to a great extent on the over side in recording/reproduction of a CD as a numerical aperture grows greater (see FIG. 3 (d)). As stated above, when no action is taken, a luminous flux arriving at photo-detecting means 30 in recording/reproduction of a CD causes flare greatly and characteristics of focus error signals thereof are deteriorated. On the contrary, when the compensation means 18 is used, spherical aberration is changed discontinuously on at least two aperture positions (two positions in the present embodiment) near the numerical aperture corresponding to necessary numerical aperture NA2. The direction for spherical aberration to be changed discontinuously at small numerical aperture NAL (position being closest to an optical axis in the second divided ring surface Sd2 and corresponding to a boundary between the first divided ring surface Sd1 and the second divided ring surface Sd2) and that at large numerical aperture NAH (position being farthest from an optical axis in the second divided ring surface Sd2 and corresponding to a boundary between the second divided ring surface Sd2 and the third divided ring surface Sd3) are opposite to each other. Due to this, a luminous flux reflected from the first optical disk and that reflected from the second optical disk can be detected satisfactorily.

In the present embodiment, since spherical aberration is originally caused on the over side (FIG. 3 (d)), when viewed in the direction from the small numerical aperture to the large numerical aperture, spherical aberration is changed discontinuously in the negative direction at numerical aperture NAL, and in the positive direction at numerical aperture NAH. Due to this, luminous fluxes reflected from a DVD with a thin transparent base board having thickness t1 and a CD with a thick transparent base board having thickness t2 can be detected satisfactorily. Incidentally, "spherical aberration is changed discontinuously" means that a sudden change in spherical aberration is observed in the spherical aberration diagram.

In the spherical aberration diagram for recording/ reproduction of a CD (FIG. 3 (c)), spherical aberration between numerical aperture NAL and numerical aperture NAH is made to be spherical aberration having the same sign (both over side in the present embodiment) as that of spherical aberration for other numerical apertures (optical axis–numerical aperture NAL, numerical aperture NAH– necessary numerical aperture NA1). Due to this, focus error signals are further improved.

Accordingly, in the present embodiment, the compensation means 18 is a means which corrects spherical aberration (a part thereof) caused on a luminous flux which is reflected on the information recording surface of the second optical disk and passes through polarized beam splitter. The reason for this is that the image forming magnification m1 is the same as that m2 in the present embodiment and no spherical aberration is hardly caused on a luminous flux which is reflected on the information recording surface of the first optical disk and passes through polarized beam splitter 12.

As stated above, in the present embodiment, the compensation means 18 is arranged to be formed so that a luminous flux (the first flux) passing through the first divided ring surface Sd1 near an optical axis is utilized for recording/ reproduction of the first and second optical disks (namely, utilized for detection of a luminous flux reflected on the information recording surface), a luminous flux (the second luminous flux) passing through the second divided ring surface Sd2 which is outside the first divided ring surface Sd1 is utilized mainly for recording/reproduction of the second optical disk, and a luminous flux (the third luminous flux) passing through the third divided ring surface Sd3 which is outside the second divided ring surface Sd2 is utilized mainly for recording/reproduction of the first optical disk.

In this case, the expression "mainly" means that in the case of a luminous flux passing through the second divided ring surface Sd2, a ratio of energy on the core portion where the central intensity of a beam spot formed on photodetecting means 30 is maximum under the condition that a luminous flux passing through the third divided ring surface Sd3 is not shielded to energy on the core portion where the central intensity of a beam spot is maximum under the condition that a luminous flux passing through the third divided ring surface Sd3 is shielded ("core energy under light-shielding"/"core energy under no light-shielding") is in the range of 60%–100%. Even in the case of a luminous flux passing through the third divided ring surface Sd3, the expression "mainly" means in the same way that a ratio of energy on the core portion under no shielding of the second divided ring surface Sd2 to energy on the core portion under shielding thereof ("core energy under light-shielding"/"core energy under no light-shielding") is in the range of 60%–100%. Incidentally, in the simple measurement of the ratio of energy, peak intensity $I_P$ and beam diameter $D_P$ (to be decided at the position where the intensity shows $e^{-2}$ for the central intensity) both at the position where the central intensity of the beam spot is maximum, are measured in each case, then $I_P \times D_P$ is obtained to be compared, because the shape of a beam at the core portion is mostly constant.

In the present embodiment, the compensation means 18 as that stated above is provided based not on an idea to make a beam spot converged on an optical disk to be in the optimum shape for each optical disk but on an idea to conduct recording/reproduction for plural optical disks by maneuvering in optical detection.

Due to this, when conducting recording/reproduction for the second optical disk, flare (mainly the third luminous flux) which causes deterioration of focus error signals is not utilized for recording/reproduction of the second optical disk. Therefore, focus error signals are improved. In this case, for recording/reproduction of the first optical disk, there is a possibility of flare because the second luminous flux is not used, but detection of a luminous flux conducted by photodetecting means 30 in recording/reproduction is not adversely affected. Therefore, the present embodiment makes it possible to reproduce plural optical disks with one light-converging optical system, while improving focus error signals. Furthermore, in the present embodiment, there is provided one light-converging optical system, and recording/reproduction for plural optical disks can be conducted by one photodetecting means. Therefore, low cost can be realized for an optical pickup apparatus.

By providing the compensation means 18 of this kind between polarized beam splitter 12 and photodetecting means 30, it is possible to enhance the intensity of light-converging on an optical disk because of no loss of an amount of light to be converged on the optical disk. This is extremely effective when recording on an optical disk, in particular. Furthermore, in the present embodiment, divided annular surfaces of the compensation means 18 can be provided at any positions, which makes it possible to make numerical aperture NA2 necessary for reading the second optical disk to be large.

Incidentally, in the present embodiment, although divided annular surfaces Sd1–Sd3 are provided on refraction surface S2 of the compensation means 18 on the part of photodetecting means 20, they can also be provided on refraction surface S1 of the compensation means 18 on the part of polarized beam splitter 12, and they can further be provided on other elements (for example, an emergence surface of polarized beam splitter 12 on the part of photodetecting means 20). When using an astigmatism method for detecting focus error signals, it is possible to reduce the number of parts and to realize low cost, by providing steps representing divided annular surfaces Sd1–Sd3 on a refraction surface on one side (S2 in the present embodiment) and by making a refraction surface on the other side to be cylindrical or toric.

Further, although a step is provided on a boundary between the first divided annular surface Sd1 and the second divided annular surface Sd2 in the present embodiment, the step may also be provided on a boundary between the second divided annular surface Sd2 and the third divided annular surface Sd3, or even a curved surface having a prescribed radius of curvature may be used to connect the divided annular surfaces.

Further, although a prismatic surface is provided on the second divided annular surface Sd2 as shown in FIG. 4 (a) in the correction means 18 in the present embodiment, the second divided annular surface Sd2 may also be constituted with a part of a spherical surface or an aspherical surface as shown in FIG. 4 (b), or it may also be constituted with a hologram (or Fresnel fringe) as shown in FIG. 4 (c). Incidentally, when the second divided annular surface Sd2 is constituted with a hologram, one of a luminous flux which is divided into a first order light and a zero-order light is used to detect a luminous flux reflected from the first optical disk and the other is used to detect a luminous flux reflected from the second optical disk. In this case, it is preferable that an amount of light of the luminous flux used to detect a luminous flux reflected from the second optical disk is greater than an amount of light of the luminous flux used to detect a luminous flux reflected from the first optical disk. Further, although the second divided annular surface Sd2 is provided to be of a ring shape coaxial with an optical axis in the present embodiment, it may also be provided to be of a concentric elliptical shape, or to be split ring shapes. Further, although the divided annular surfaces are provided up to the second one, they can be provided up to the third or fourth one.

In the present embodiment, the first semiconductor laser 111 and the second semiconductor laser 112 are provided as a light source so that recording/reproduction of even CD-R as the second optical disk can be conducted. However, when conducting recording/reproduction of CD without conducting recording/reproduction of CD-R as the second optical disk, the second semiconductor laser 112 and compounding means 19 are not used but the first semiconductor laser 111 alone is used. Incidentally, in this case, structural components (given the same symbols) as well as functions and actions are the same as those in the present embodiment, and explanation thereof will be omitted accordingly.

(Second Embodiment)

Next, the second embodiment will be explained as follows with reference to FIG. 6 which is a schematic structural diagram of optical pickup apparatus 10. In the first embodiment state above, optical pickup apparatus 10 is one wherein luminous fluxes reflected respectively from the first optical disk and the second optical disk are detected by the same photodetecting means 30, but in the present embodiment, optical pickup apparatus 10 is one wherein the first photodetecting means 31 which detects a luminous flux reflected from the first optical disk and the second photodetecting means 32 which detects a luminous flux reflected from the second optical disk are provided as a photodetecting means. Incidentally, members having the same functions and actions as those in the first embodiment are given the same numbers and are omitted in terms of explanation. In FIG. 6, quarter wavelength plate 14 and two-dimensional actuator 15 are omitted.

In the present embodiment, the first changing means 121 which changes an optical path of a luminous flux emerged from the first semiconductor laser 111 and/or an optical path of a luminous flux reflected on the information recording surface of an optical disk and the second changing means 122 which changes an optical path of a luminous flux emerged from the second semiconductor laser 112 and/or an optical path of a luminous flux reflected on the information recording surface of an optical disk are provided as a changing means. These first and second changing means 121 and 122 are both constituted with a beam splitter.

In the present embodiment, compensation means 181 is provided between the second beam splitter 122 and detecting means 32, for improving focus error signals. This compensation means 181 is a means which corrects spherical aberration caused on a luminous flux which is reflected on the information recording surface of an optical information recording medium on at least one side and passes through the changing means, in the course of recording/reproduction of an optical information recording medium on at least one side. In the present embodiment wherein image forming magnification m1 of a light-converging optical system in recording/reproduction of the first optical disk is the same as that m2 of a light-converging optical system in recording/reproduction of the second optical disk, the compensation means 181 is supposed to correct spherical aberration caused by a difference between thickness t1 of a transparent base board of the first optical disk and thickness t2 of a transparent base board of the second optical disk, namely, spherical aberration caused on a luminous flux which is reflected from the information recording surface of the second optical disk and passes through the changing means in the present embodiment. Incidentally, when the image forming magnification m1 is different from that m2, the compensation means 18 is arranged so that it corrects spherical aberration caused by a difference between t1 and t2 and by a difference between the image forming magnification of the light-converging optical system m1 and that m2.

The compensation means 181 in the present embodiment is a single lens (which may also be constituted with an aspherical surface) having positive refracting power so that it can correct in a way that spherical aberration (see FIG. 3 (d)) caused on a luminous flux which is reflected from the information recording surface of the second optical disk and passes through the second beam splitter 122 is hardly caused.

In the present embodiment, the compensation means 181 as that stated above is provided based not on an idea to make a beam spot converged on an optical disk to be in the optimum shape for each optical disk but on an idea to conduct recording/reproduction for plural optical disks by maneuvering in optical detection. Since the compensation means 181 is provided between the second beam splitter 122 and the detecting means 30, it is possible to improve focus error signals caused by flare which is a problem when conducting recording/reproduction for plural optical disks each having different thickness of a transparent base board by the use of one light-converging optical system. By providing the compensation means 181 between the second beam splitter 122 and photodetecting means 30, it is possible to enhance the intensity of light-converging on an optical disk because of no loss of an amount of light to be converged on the optical disk.

Incidentally, as a compensation means in the present embodiment, the compensation means 18 described in the first embodiment can naturally be used.

EXAMPLES

An example of the invention will be explained as follows. The example is an example in the first embodiment stated above. Let it be assumed that a DVD (transparent base board t1=0.6 mm, necessary numerical aperture NA1=0.60 (first semiconductor laser 111 wavelength λ=635 nm)) is used as the first optical disk and a CD (transparent base board t2=1.2 mm, necessary numerical aperture NA2=0.45 (λ=780 nm) ) is used as the second optical disk.

Lens data are shown in Table 1.

TABLE 1

| Surface No. | r | d (λ = 635 nm) | n (λ = 635 nm) | d (λ = 780 nm) | n (λ = 780 nm) |
|---|---|---|---|---|---|
| 0 (Luminescence point) | | 10.382 | 1.0 | 10.564 | 1.0 |
| 1 | ∞ | 5.0 | 1.51455 | 5.0 | 1.51072 |
| 2 | ∞ | 2.0 | 1.0 | 2.0 | 1.0 |
| 3 | ∞ | 5.0 | 1.51455 | 5.0 | 1.51072 |
| 4 | ∞ | 3.0 | 1.0 | 3.0 | 1.0 |
| 5 | 146.262 | 1.7 | 1.5383 | 1.7 | 1.5336 |
| 6 | −13.471 | 6.0 | 1.0 | 6.0 | 1.0 |
| 7 (Iris) | ∞ | 2.0 | 1.0 | 2.0 | 1.0 |
| 8 | 2.114 | 2.2 | 1.5383 | 2.2 | 1.5336 |
| 9 | −7.963 | 1.757 | 1.0 | 1.437 | 1.0 |

TABLE 1-continued

| Surface No. | r | d (λ = 635 nm) | n (λ = 635 nm) | d (λ = 780 nm) | n (λ = 780 nm) |
|---|---|---|---|---|---|
| 10 (Disk) | ∞ | 0.6 | 1.58 | 1.2 | 1.55 |
| 11 (Disk) | ∞ | 0.6 | 1.58 | 1.2 | 1.55 |
| 12 | ∞ | 1.757 | 1.0 | 1.437 | 1.0 |
| 13 | 7.963 | 2.2 | 1.5383 | 2.2 | 1.5336 |
| 14 | −2.114 | 2.0 | 1.0 | 2.0 | 1.0 |
| 15 (Iris) | ∞ | 6.0 | 1.0 | 6.0 | 1.0 |
| 16 | 13.471 | 1.7 | 1.5383 | 1.7 | 1.5336 |
| 17 | −146.262 | 3.0 | 1.0 | 3.0 | 1.0 |
| 18 | ∞ | 5.0 | 1.51455 | 5.0 | 1.51072 |
| 19 | ∞ | 2.0 | 1.0 | 2.0 | 1.0 |
| 20 | ∞ | 5.0 | 1.51455 | 5.0 | 1.51072 |
| 21 | ∞ | 1.0 | 1.0 | 1.0 | 1.0 |
| 22 (Stepped surface) | ∞ | | | | |

Table 1 shows surfaces through which a luminous flux emitted from a semiconductor laser passes which are numbered to be i-th surface to be increased successively in the direction of advancement of the luminous flux which advances to an optical disk and is reflected on its information recording surface, including the 0-th surface which is a luminescence point of each of the first and second semiconductor lasers up to the surface of compensation means 18 on the part of a light source. A radius of curvature of the surface which intersects an optical axis is represented by r, a distance between the i-th surface and the (i+1)-th surface is represented by d, and a refractive index concerning a wavelength of a luminous flux emitted from a semiconductor laser used is represented by n. Incidentally, the light advancement direction has a positive sign.

Data of the aspheric surface are shown in Table 3.

TABLE 2

| 6th surface | K = −0.70862 | |
| 8th surface | K = −0.97770 | |
| | A1 = +0.63761 × 10⁻³ | P1 = 3.0 |
| | A2 = +0.36688 × 10⁻³ | P2 = 4.0 |
| | A3 = +0.83511 × 10⁻² | P3 = 5.0 |
| | A4 = −0.37296 × 10⁻² | P4 = 6.0 |
| | A5 = +0.46548 × 10⁻³ | P5 = 8.0 |
| | A6 = −0.43124 × 10⁻⁴ | P6 = 10.0 |
| 9th surface | K = −0.25642 × 10⁺² | |
| | A1 = +0.13752 × 10⁻² | P1 = 3.0 |
| | A2 = −0.41110 × 10⁻² | P2 = 4.0 |
| | A3 = +0.21176 × 10⁻¹ | P3 = 5.0 |
| | A4 = −0.13885 × 10⁻¹ | P4 = 6.0 |
| | A5 = +0.16668 × 10⁻² | P5 = 8.0 |
| | A6 = −0.12187 × 10⁻³ | P6 = 10.0 |
| 13th surface | K = −0.25642 × 10⁺² | |
| | A1 = −0.13752 × 10⁻² | P1 = 3.0 |
| | A2 = +0.41110 × 10⁻² | P2 = 4.0 |
| | A3 = −0.21176 × 10⁻¹ | P3 = 5.0 |
| | A4 = +0.13885 × 10⁻¹ | P4 = 6.0 |
| | A5 = −0.16668 × 10⁻² | P5 = 8.0 |
| | A6 = +0.12187 × 10⁻³ | P6 = 10.0 |
| 14th surface | K = −0.97770 | |
| | A1 = −0.63761 × 10⁻³ | P1 = 3.0 |
| | A2 = −0.36688 × 10⁻³ | P2 = 4.0 |
| | A3 = −0.83511 × 10⁻² | P3 = 5.0 |
| | A4 = +0.37296 × 10⁻² | P4 = 6.0 |
| | A5 = −0.46548 × 10⁻³ | P5 = 8.0 |
| | A6 = +0.43124 × 10⁻⁴ | P6 = 10.0 |
| 16th surface | K = −0.70862 | |

The expression of the aspheric surface is based on the following expression.

$$X = (H^2/r) / \left[1 + \sqrt{1 - (1+K)(H/r)^2}\right] + \sum_j A_j H^{P_j}$$

In the above expression, X represents an axis in the direction of an optical axis, H represents an axis in the direction perpendicular to an optical axis, a sign for the light advancement direction is positive, K represents constant of the cone, Aj represents constant of the aspheric surface, and Pj represents an exponent of the aspheric surface.

Table 3 shows data of the surface (22nd surface) of the compensation means 18 on the part of photodetecting means 30.

TABLE 3

| Distance from an optical axis H | Δ X |
|---|---|
| 1.0 | 0.0 |
| 0.9 | 0.0 |
| 0.8 | 0.0 |
| 0.7 | 0.0 |
| 0.6 | +0.0213 |
| 0.5 | +0.0425 |
| 0.4 | 0.0 |
| 0.3 | 0.0 |
| 0.2 | 0.0 |
| 0.1 | 0.0 |
| 0 | 0.0 |

The symbol ΔX represents a distance in the optical axis direction in which a distance value at the point where the surface intersects an optical axis is zero. Incidentally, in the compensation means 18, a ring-shaped prism is provided on the area ranging from 0.5 to 0.7 in terms of distance H from an optical axis, and an refracting angle of the prism is 78°.

FIG. 7 (a) shows a diagram of spherical aberration on the information recording surface in the course of recording/reproduction of a DVD, and FIG. 7 (b) shows a diagram of spherical aberration on the information recording surface in the course of recording/reproduction of a CD. FIG. 8 (a) shows a diagram of spherical aberration on a photodetecting means in the course of recording/reproduction of a DVD, and FIG. 8 (b) shows a diagram of spherical aberration on a photodetecting means in the course of recording/reproduction of a CD.

In the examples stated above, recording/reproduction can be conducted satisfactorily for both DVD and CD, and in particular, focus error signals in the course of recording/reproduction of CD have been improved.

What is claimed is:

1. An optical pickup apparatus for reading information from one of different kinds of optical information recording medium, each having a transparent base board in different thickness, or for recording information onto one of said different kinds of optical information recording medium, comprising:

a laser light source;

a light converging optical system for converging luminous flux from said laser light source through said transparent base board of said optical information recording medium onto an information recording surface of said optical information recording medium;

a changing means for changing an optical path of said luminous flux, being reflected on said information recording surface, to be different from an optical path of said luminous flux, being emitted from said laser light source;

an photo-detecting means for detecting said luminous flux being reflected on said information recording surface; and a compensation means, provided between said changing means and said photo-detecting means, for correcting spherical aberration of said luminous flux, being reflected on said information recording surface and passed through said changing means, when one of said different kinds of optical information recording medium is subjected to recording or reading information.

2. The optical pickup apparatus of claim 1, wherein said different kinds of optical information recording medium includes:

a first optical information recording medium having a transparent base board whose thickness is t1; and a second optical information recording medium having a transparent base board whoops thickness is t2 wherein t2 is not equal to t1.

3. The optical pickup apparatus of claim 2, wherein image forming magnification of said light converging optical system is m1 when said apparatus performs recording or reading operation on said first optical information recording medium; image forming magnification of said light converging optical system is m2 when said apparatus performs recording or reading operation on said second optical information recording medium; said compensation means corrects said spherical aberration caused by the difference of thickness between t1 and t2 or caused by the difference of thickness between t1 and t2 and the difference of image forming magnification between m1 and m2.

4. The optical pickup apparatus of claim 2, wherein said laser light source includes:

a first laser light source for performing recording or reproduction operation of information on said first optical information recording medium; and a second laser light source for performing recording or reproduction operation of information on said second optical information recording medium.

5. The optical pickup apparatus of claim 2, wherein said photo-detecting means includes:

a first photo-detecting means for detecting said luminous flux being reflected on a information recording surface of said first optical information recording medium; and a second photo-detecting means for detecting said luminous flux being reflected on an information recording surface of said second optical information recording medium.

6. The optical pickup apparatus of claim 5, wherein said compensation means is provided between said changing means and said second photo-detecting means.

7. The optical pickup apparatus of claim 6, wherein said compensation means corrects spherical aberration of said luminous flux, being reflected on said information recording surface of said second optical information recording medium and passed through said changing means.

8. The optical pickup apparatus of claim 2, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said compensation means is an optical element for:

a) dividing said luminous flux to a first luminous flux in vicinity of an optical axis of said optical element, a second luminous flux outside of said first luminous flux, and a third luminous flux outside of said second luminous flux;

b) using said first luminous flux for detecting a luminous flux being reflected on information recording surfaces of said first optical information recording medium and said second optical information recording medium;

c) using said second luminous flux for mainly detecting a luminous flux being reflected on an information recording surface of said second optical information recording medium; and d) using said third luminous flux for mainly detecting a luminous flux being reflected on an information recording surface of said first optical information recording medium.

9. The optical pickup apparatus of claim 2, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said compensation means includes:

a first side surface, being coaxial with said luminous flux, having a plurality of divided surfaces;

a first divided surface, of said plurality of divided surfaces, provided in vicinity of an optical axis of said compensation means;

a second divided surface, of said plurality of divided surfaces, provided outside of said first divided surface; and a third divided surface, of said plurality of divided surfaces, provided outside of said second divided surface;

wherein said luminous flux, as being through said first divided surface and third divided surface, is converged onto said photo-detecting means when said photo-detecting means detects said luminous flux being reflected on an information recording surface of said first optical information recording medium, and said luminous flux, as being through said second divided surface, is not converged onto said photo-detecting means when said photo-detecting means detects said luminous flux being reflected on an information recording surface of said second optical information recording medium.

10. The optical pickup apparatus of claim 9, wherein said compensation means includes steps at least on one side surface and said plurality of divided surfaces are divided by said steps.

11. The optical pickup apparatus of claim 2, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said compensation means includes:

a first side surface, being coaxial with said luminous flux, having a plurality of divided surfaces;

a first divided surface, of said plurality of divided surfaces, provided in vicinity of an optical axis of said compensation means;

a second divided surface, of said plurality of divided surfaces, provided outside of said first divided surface; and a third divided surface, of said plurality of divided surfaces, provided outside of said second divided surface;

wherein said luminous flux, as being through said second divided surface, is converged onto a first position on said photo-detecting means when said photo-detecting means detects said luminous flux being reflected on an information recording surface of said second optical information recording medium;

wherein said first position is between a second position, where light beams of said luminous flux, as being through said first divided surface and along closer side in a direction perpendicular to the optical axis of said compensation means, is converged onto said photo-detecting means, and a third position, where light beams of said luminous flux, as being through said first divided surface and along further side in a direction perpendicular to the optical axis of said compensation means, is converged onto said photo-detecting means.

12. The optical pickup apparatus of claim 11, wherein said compensation means includes steps at least on one side surface and said plurality of divided surfaces are divided by said steps.

13. The optical pickup apparatus of claim 2, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said compensation means discontinuously changes said spherical aberration to at least two different numerical apertures corresponding closer to NA2.

14. The optical pickup apparatus of claim 13, wherein said at least two different numerical apertures includes the smallest numeral aperture of NAL and the largest numeral aperture of NAH wherein NAH is larger than NA2 and NA2 is larger than NAL; and said compensation means discontinuously changes said spherical aberration so that a direction, that said spherical aberration is changed from a range smaller than NAL to a range between NAL and NAH, is opposite to a direction that said spherical aberration is changed from a range between NAL and NAH to a range larger NAH.

15. The optical pickup apparatus of claim 14, wherein when said photo-detecting means detects said luminous flux being reflected on an information recording surface of said second optical information recording medium, said compensation means changes said spherical aberration so that said spherical aberration of said light converging optical system, at a detecting surface of said photo-detecting means for the range between the numerical apertures of NAL and NAH, is in the same sign side of that of other ranges of numerical apertures.

16. The optical pickup apparatus of claim 2, wherein the best wave front aberration of said light converging optical system is not more than 0.05 λrms when the luminous flux irradiated from said laser light source is converged onto an information recording surface of said optical information recording medium.

17. A compensation apparatus in use with an optical pickup apparatus in which luminous flux, irradiated from a laser light source, is converged with a light converging system onto an information recording surface of an optical information recording medium through a transparent base board of said optical information recording medium and an optical path of said luminous flux, being reflected on said information recording surface, is changed by a changing means to be different from an optical path of said luminous flux, being emitted from said laser light source, said compensation apparatus comprising:

an optical compensation element of a transparent panel-like material or a transparent lens-like material, including:

a) a first side surface, being coaxial with said luminous flux, having a plurality of divided surfaces;

b) a first divided surface, of said plurality of divided surfaces, provided in vicinity of an optical axis of said compensation means;

c) a second divided surface, of said plurality of divided surfaces, provided outside of said first divided surface; and d) a third divided surface, of said plurality of divided surfaces, provided outside of said second divided surface;

wherein said optical pickup apparatus, with which said compensation apparatus is used, reads information from one of different kinds of optical information recording medium, each having a transparent base board in different thickness, or records information onto one of said different kinds of optical information recording medium; and wherein said optical compensation element is provided between said changing means and said photo-detecting means.

18. The compensation apparatus of claim 17, wherein said optical compensation element includes steps at least on one side surface and said plurality of divided surfaces are divided by said steps.

19. The compensation apparatus of claim 17, wherein said optical compensation element includes a cylindrical surface or a toric surface on one side surface other than said first side surface having said plurality of divided surfaces.

20. The compensation apparatus of claim 17, wherein said optical information recording medium is selected from different kinds of optical information recording medium, each having a different thickness, and said different kinds of optical information recording medium includes:

a first optical information recording medium having a transparent base board whose thickness is t1; and a second optical information recording medium having a transparent base board whose thickness is t2 wherein t2 is not equal to t1.

21. The compensation apparatus of claim 20, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said luminous flux, as being through said first divided surface and third divided surface, is converged onto said photo-detecting means when said photo-detecting means detects said luminous flux being reflected on an information recording surface of said first optical information recording medium, and said luminous flux, as being through said second divided surface, is not converged onto said photo-detecting means when said photo-detecting means detects said luminous flux being reflected on an information recording surface of said second optical information recording medium.

22. The compensation apparatus of claim 20, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said luminous flux, as being through said second divided surface, is converged onto a first position on said photo-detecting means when said photo-detecting means detects said luminous flux being reflected on an information recording surface of said second optical information recording medium;

wherein said first position is between a second position, where light beams of said luminous flux, as being through said first divided surface and along closer side in a direction perpendicular to the optical axis of said compensation element, is converged onto said photo-detecting means, and a third position, where light beams of said luminous flux, as being through said first divided surface and along further side in a direction perpendicular to the optical axis of said compensation element, is converged onto said photo-detecting means.

23. The compensation apparatus of claim 20, wherein a required numerical aperture of said light converging optical system, at the side of said optical information recording medium, for performing recording or reproduction operation on said first optical recording medium is NA1; a required numerical aperture of said light converging optical system, at the side of said optical information recording medium, for performing recording or reproduction operation on said second optical recording medium is NA2 wherein NA1 is larger than NA2; and said compensation element discontinuously changes said spherical aberration to at least two different numerical apertures corresponding closer to NA2.

24. The compensation apparatus of claim 20, wherein said at least two different numerical apertures includes the smallest numeral aperture of NAL and the largest numeral aperture of NAH wherein NAH is larger than NA2 and NA2 is larger than NAL; and said compensation element discontinuously changes said spherical aberration so that a direction, that said spherical aberration is changed from a range smaller than NAL to a range between NAL and NAH, is opposite to a direction that said spherical aberration is changed from a range between NAL and NAH to a range larger NAH.

25. The compensation apparatus of claim 20, wherein when said photo-detecting means detects said luminous flux being reflected on an information recording surface of said second optical information recording medium, said compensation element changes said spherical aberration so that said spherical aberration of said light converging optical system, at a detecting surface of said photo-detecting means for the range between the numerical apertures of NAL and NAH, is in the same sign side of that of other ranges of numerical apertures.

* * * * *